US009174275B2

(12) United States Patent
Brandl et al.

(10) Patent No.: US 9,174,275 B2
(45) Date of Patent: Nov. 3, 2015

(54) METHOD FOR MANUFACTURING A METAL-CERAMIC COMPOSITE STRUCTURE AND METAL-CERAMIC COMPOSITE STRUCTURE

(71) Applicant: ALSTOM Technology Ltd, Baden (CH)

(72) Inventors: Herbert Brandl, Waldshut-Tiengen (DE); Hans-Peter Bossmann, Lauchringen (DE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/189,377

(22) Filed: Feb. 25, 2014

(65) Prior Publication Data
US 2014/0242408 A1 Aug. 28, 2014

(30) Foreign Application Priority Data
Feb. 25, 2013 (EP) .................................. 13156516

(51) Int. Cl.
*B22D 19/00* (2006.01)
*B22D 19/04* (2006.01)
*B22D 19/08* (2006.01)
*C04B 37/02* (2006.01)
*C23C 6/00* (2006.01)
*B32B 15/04* (2006.01)

(52) U.S. Cl.
CPC ................ *B22D 19/00* (2013.01); *B22D 19/04* (2013.01); *B22D 19/08* (2013.01); *B32B 15/043* (2013.01); *C04B 37/026* (2013.01); *C23C 6/00* (2013.01); *Y10T 428/12396* (2015.01)

(58) Field of Classification Search
CPC .......... B22D 19/00; B22D 19/04; B22D 19/08
USPC ............................................ 164/98, 108, 111
See application file for complete search history.

(56) References Cited

U.S. PATENT DOCUMENTS

| 3,918,255 | A | | 11/1975 | Holden |
| 4,646,810 | A | | 3/1987 | Lardellier |
| 5,022,462 | A | * | 6/1991 | Flint et al. ..................... 165/80.4 |
| 2004/0258900 | A1 | * | 12/2004 | Simon et al. ............... 428/293.4 |
| 2006/0216547 | A1 | | 9/2006 | Vance |
| 2010/0260960 | A1 | | 10/2010 | Vance |
| 2011/0123323 | A1 | | 5/2011 | Ruberte Sanchez et al. |
| 2011/0243724 | A1 | | 10/2011 | Campbell et al. |

FOREIGN PATENT DOCUMENTS

| EP | 0 658 724 | 6/1995 |
| EP | 2189626 | 1/2012 |

(Continued)

OTHER PUBLICATIONS

Office action issued from Japanese Patent Office dated Jan. 5, 2015 for JP Application No. Application No. 2014-033839.

*Primary Examiner* — Kevin P Kerns

(57) ABSTRACT

A method for manufacturing a metal-ceramic composite structure for high temperature exposure is provided, whereby the composite structure includes a base metal structure or component, which is on at least one side covered and permanently joined with one or more ceramic tiles. The method may include the steps of: manufacturing green bodies with cavities and sintering the green bodies to receive ceramic tiles into cavities; arranging the ceramic tiles in a cast mould; pouring liquid metal into the cast mould to substantially fill the cavities; creating an intermediate metal layer; and solidifying the liquid metal to permanently join the ceramic tiles and the intermediate metal layer.

8 Claims, 2 Drawing Sheets

(56) References Cited

FOREIGN PATENT DOCUMENTS

| JP | 54-102412 | 8/1979 |
| JP | 55-060604 | 5/1980 |
| JP | 59-004824 | 1/1984 |
| JP | 01-099767 | 4/1989 |
| JP | 04-119974 | 4/1992 |
| JP | 60-155579 | 8/1995 |
| JP | 2005-090512 | 4/2005 |

* cited by examiner

METHOD FOR MANUFACTURING A METAL-CERAMIC COMPOSITE STRUCTURE AND METAL-CERAMIC COMPOSITE STRUCTURE

CROSS-REFERENCE TO RELATED APPLICATIONS

This application claims priority to European application 13156516.0 filed Feb. 25, 2013, the contents of which are hereby incorporated in its entirety.

TECHNICAL FIELD

The present invention relates to a method for manufacturing composite structures. It refers to a method for manufacturing a metal-ceramic composite structure. It further refers to a metal-ceramic composite structure for being used under high temperature conditions, preferably above 300° C.

BACKGROUND

Sintered ceramic tiles have got a higher temperature capability than thermal barrier coatings (TBC), which are frequently used in the hot gas path of gas turbines. Thus, for insulation purposes thicker ceramic tiles can be used as thermal protection before application limits are reached. This, in turn, allows for increased cooling air savings for the part, which is beneficial for the overall efficiency of the machine.

However, joining of ceramic tiles to base metal structure is a challenge. They cannot be sprayed like TBCs onto the surface of base metal structure as they require sintering at temperatures beyond base metal melting temperature. Thus, pre-manufactured sintered ceramic tiles must be joined to the base metal structure.

Prior art of joining is—among other technologies—bonding of ceramic tiles to a base structure (e.g. U.S. Space Shuttle). Means of bonding are for example cements or brazing.

Such a joining of ceramic tiles to base metal structure requires low shape tolerances of joint partners and suitable braze connecting metal and ceramic. Residual shear stresses often result in cracking and failures next to the joint.

Other technologies are also known in the art:

Document U.S. Pat. No. 3,918,255 discloses a gas turbine power plant, wherein a metal combustion chamber cylinder is lined on its inside with two layers of ceramic material. The radially innermost layer is an interlocking, tile-like structure of dense ceramic material providing good thermal shock resistance. The intermediate layer which is disposed between the metal cylinder and the innermost layer is a low density ceramic material providing high thermal insulation. The layers of ceramic material are supported by ceramic tubes extending from the outer metal cylinder of the combustor through the intermediate wall and the inner wall. The tubes are also used to direct cooling air into the combustion chamber and increase the turbulence of the burning fuel and air within the chamber.

Document JP 59004824 A discloses a structure in which a tile-shaped ceramics member is arranged at the surface of the metal inner cylinder of a hot gas turbine combustor, said metal surface of the inner cylinder is covered by a ceramics layer with a porosity of 8-30%. The applied ceramics layer is of porous material and preferably has such a value as approximating to the coefficient of thermal expansion of the metal structure. As examples for the ceramics, yttria (Y2O3), stabilized zirconia (ZrO2), magnesia (MgO), calcia (CaO) etc. are applied. In case that the porosity of the ceramic layer is less than 8%, tacky peeling of the layer may easily be made, and in turn if it exceeds 30% or more, cohesion aggregation peeling of the layer may easily be made. The thickness of the ceramics is preferably in a range of 0.1-0.5 mm.

Document EP 0 658 724 A2 discloses a combustion chamber, in particular for gas turbines, with a hollow-cylindrical supporting wall, on the inside of which a lining composed of individual ceramic elements is arranged, the ceramic elements being designed as trapezohedrons, the base areas of which are adapted to the geometry of the combustion chamber and are fastened to the inside of the supporting wall.

Document US 2011/0123323 A1 discloses an assembly for use in a gas turbine engine that has an underlying metal sheet, and at least one ceramic matrix composite tile attached to the underlying metal sheet with at least one fastener assembly. The panel fastener assembly includes a fastener having a threaded portion extending rearwardly from a head, which has a frustoconical surface facing the threaded portion. The frustoconical surface is received in a frustoconical bore in the ceramic matrix composite panel. A bushing is positioned on an opposed side of the metal sheet from the ceramic matrix composite panel. The bushing has a flange extending away from the metal sheet. A sleeve is received about the threaded portion of the fastener, and extends away from the panel, beyond the metal sheet. The sleeve has a lip extending radially outwardly toward the flange on the bushing, such that the flange on the bushing extends beyond a space defined between the lip and a seating surface on the bushing. A wave spring is received within the cavity.

Several other documents, for example abstracts of JP H04 119974 A, JP H01 99767 A or JP S60 155579 A disclose forming ceramic-metal composite material or workpieces by casting molten metal on a ceramic with interlocking joints.

On the other hand, it is known from document US 2011/0243724 A1 that a metal-to-metal joint can be established by so called bi-cast process.

However, there is still a need for a process of manufacturing a metal-ceramic composite structure, especially for components being used in the hot gas path of a gas turbine, which process results in structures of superior mechanical stability and high temperature capability.

SUMMARY

It is an object of the present invention to establish a method for manufacturing a metal-ceramic composite structure, which fulfills these needs and avoids the disadvantages of the prior art methods.

It is a further object of the invention to provide metal-ceramic composite structure, which is superior to known composite structures with regard to mechanical and thermal stability. Preferably the metal-ceramic composite structure according the invention should be used at temperatures above 300° C.

These and other objects are obtained by methods and metal-ceramic composite structures as described herein.

The method according to the invention for manufacturing a metal-ceramic composite structure, preferably intended to be exposed to high temperatures, comprises a base metal structure or component, which is on at least one side covered and permanently joined with one or more ceramic tiles.

The method comprises the steps of:
a) manufacturing one or more green bodies with cavities extending from the surface on one side of said green bodies into the interior of said green bodies and sintering said green bodies to receive one or more ceramic tiles with respective cavities;

b) arranging said ceramic tiles in a cast mould, whereby the ceramic tiles are used as a part of said mould;

c) pouring liquid metal into said cast mould at a temperature and pressure that said cavities of said ceramic tiles are filled completely or to a great extent in order to fabricate an intermediate metal layer to be joined with said base metal structure or component; wherein the intermediate layers are created with mechanical interlocks between said ceramic tiles and said intermediate metal layers;

d) after solidification of said poured-in metal taking the resulting metal-ceramic structure with its mechanical interlocks between said ceramic tiles and said intermediate metal layer, out of said cast mould, and said ceramic tiles with said intermediate layers are then permanently joined with said base metal structure or component.

Because of the intermediate metal layer, which preferably covers the whole joint face of the tile with a thickness (a), this metal-ceramic structure can be then be joined with the base metal structure or component in the usual way, e.g. by metal-to-metal brazing. This is a big advantage.

Green bodies are made from a ceramic powder mixture (including the permanent additives) by a forming process like casting, plastic forming and pressing. They contain in addition moisture and often organic deflocculants, plasticisers, binders and other additives. All components that are volatile at higher temperatures, i.e. which vaporise or decompose, must be removed from the green body with particular care before sintering in order to avoid damage.

According to an embodiment of the invention, the metal used for said base metal structure or component, or said intermediate metal layer, is a Ni-based superalloy.

According to a further embodiment of the invention, in step (b) soluble ceramics are used for assembly and masking of the ceramic tiles.

According to just another embodiment of the invention, said cavities in said ceramic tiles are arranged in such a way that most of the ceramic at said mechanical interlocks is under compression during later use over the used temperature range.

According to a further embodiment of the invention, said base metal structure or component is a hot gas path part of a gas turbine.

Specifically, said base metal structure or component is a stator heat shield.

Specifically, said base metal structure or component is a combustor liner.

Specifically, said base metal structure or component is a platform and/or airfoil of a blade and/or vane.

The metal-ceramic composite structure according to the invention, preferably for being used under high temperature conditions, especially in a gas turbine, comprises a base metal structure or component or intermediate metal layer, which is on at least one side covered and permanently joined with one or more ceramic tiles. It is characterized in that said joint between said ceramic tiles and said intermediate metal layer comprises mechanical interlocks between said ceramic tiles and said intermediate metal layer, said mechanical interlocks consisting of cavities within said ceramic tiles being filled completely or to a great extent with metal that is directly joined with intermediate metal layer, and said intermediate layer being joined with the base metal structure or component.

According to an embodiment of the invention, said base metal structure or component is a hot gas path part of a gas turbine.

Specifically, said base metal structure or component is a stator heat shield.

Specifically, said base metal structure or component is a combustor liner.

Specifically, said base metal structure or component is a platform and/or airfoil of a blade and/or vane.

According to another embodiment of the invention the metal used for said base metal structure or component or intermediate layer is a Ni-based superalloy.

BRIEF DESCRIPTION OF THE DRAWINGS

The present invention is now to be explained more closely by means of different embodiments and with reference to the attached drawings.

DETAILED DESCRIPTION

Figure 1:
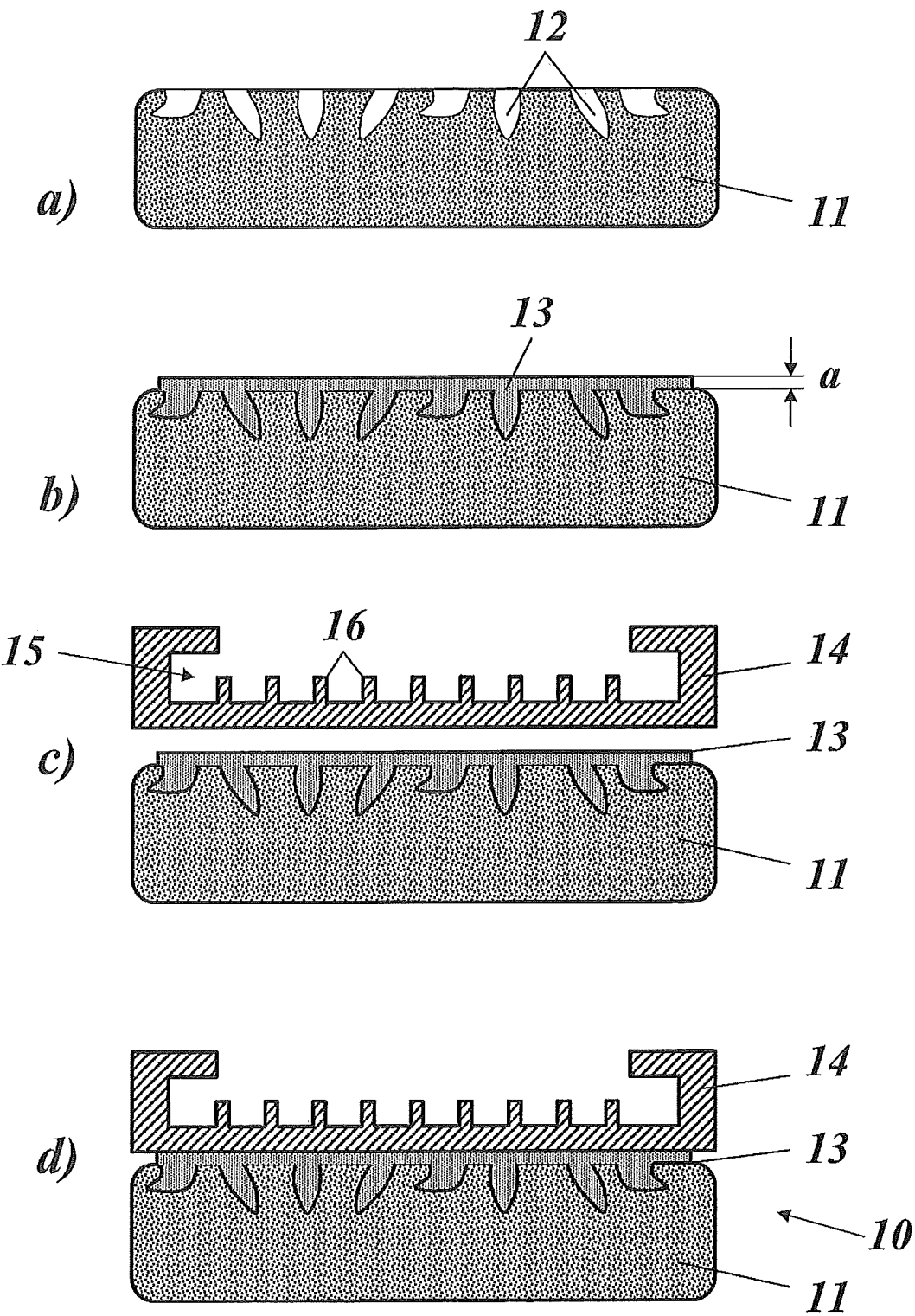
FIGS. 1A-1D show various process steps in a manufacturing method according to an embodiment of the invention and FIG. 2 shows an embodiment of the structure according to the invention.

The present invention is based on the idea of replacing the bonding by an integrated mechanical interlock between base structure and ceramic tiles with an intermediate layer. This is illustrated in FIG. 2 (schematic). The metal-ceramic composite structure 30 of FIG. 2 (or metal-ceramic structure 10 of FIG. 1d) comprises base metal structure or component (e.g. blade, vane, combustor liner, platform etc.) 23, which—in this case—has on its back side a cooling chamber 24 (or cooling chamber 15 with cooling ribs 16 of FIG. 1c) for receiving cooling air in an impingement cooling arrangement with an impingement plate 25. During operation, cooling air enters the chamber 24 through plural impingement holes 26, impinges on the inner wall of the component 23 and exits through cooling air channels 27.

The thermally loaded front side of the component 23 is protected against high temperatures by ceramic tiles 21 and 22, which abut at gap 29 and are fixed on the front side of the component 23 by mechanical interlocking elements in the form of mushroom-like cavities 28 in the tiles 21, 22 being filled with metal and forming an intermediate layer 13. The metal can be the same material like the metal the component 23 is made of. The cavities may have other forms (see for example FIG. 1(a), cavity 12).

In any case, the cavities in the ceramic tiles should be arranged in such a way that most of the ceramic at the mechanical interlocks is under compression during operation over the used temperature range.

Manufacturing process of such a part is as follows (see FIG. 1):

First, one or more green bodies with cavities 12, 28 extending from the surface on one side of said green bodies into the interior of said green bodies are manufactured and then sintered to receive one or more ceramic tiles 11 (or 21, 22 in FIG. 2) with respective cavities 12 (or 28 in FIG. 2).

Then, said ceramic tiles 11, 21, 22 are arranged in a suitable cast mould (explicitly not shown in the figures), whereby the ceramic tiles 11, 21, 22 with their cavities 12, 28 themselves are used as a part of said mould.

Figure 2:
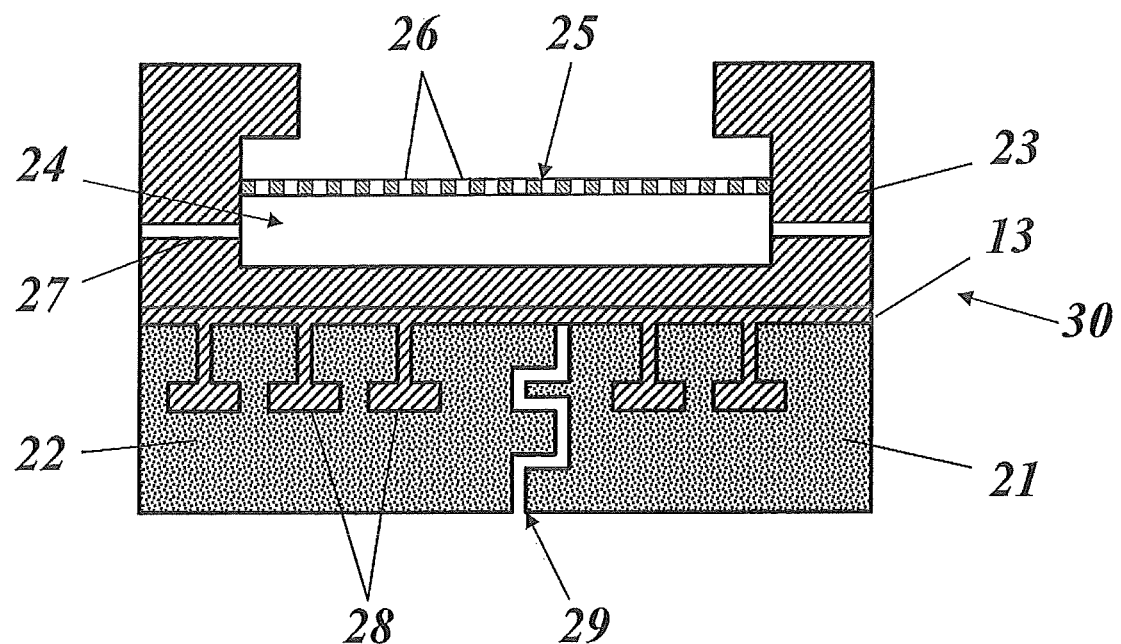

In the next step, liquid metal, preferably a Ni-based superalloy, is poured into the cast mould through respective filling channels at a temperature and pressure that said cavities 12, 28 of said ceramic tiles 11, 21, 22 are filled completely or to a great extent with said metal in order to fabricate a ceramic metal composite structure with an intermediate metal layer 13 to be joined with said base metal structure or component 14 (as shown in FIG. 1). The ceramic tiles 11, 21, 22 with their cavities are thereby part of the mould.

After solidification of said poured-in metal the resulting metal-ceramic structure with its mechanical interlocks between said ceramic tiles 11 and said intermediate metal layer 13 (FIG. 1), is taken out of said cast mould.

Because of the intermediate metal layer 13 (FIG. 1), which preferably covers the whole joint face of the tile 11 with a thickness a, this metal-ceramic structure 11, 13 can be then be joined with the base metal structure or component 14 in the usual way, e.g. by metal-to-metal brazing. This is a big advantage.

The invention allows attaching ceramic tiles to hot gas path parts of gas turbines, for example stator heat shields, combustor liners, platforms and airfoils of blades and vanes. When used for more complex parts like blades and vanes this idea can be advantageously used in connection with a rotor blade arrangement disclosed in document EP 2 189 626 B1 to simplify part geometry.

The advantages of the present invention are:
Simple means of joining ceramic tiles to base structures;
Cost effective joining process;
At the fixation zone the ceramic tiles are in compression during operation as the thermal expansion coefficient of the metal is larger than the thermal expansion coefficient of the ceramic, so that the ceramic is always under pressure below the melting point of the metal, which is beneficial for the ceramics.

The invention claimed is:

1. A method for manufacturing a metal-ceramic composite structure having a base metal structure or component, which is on at least one side covered and joined with one or more ceramic tiles, said method comprising:
    a) manufacturing one or more green bodies with cavities extending from a surface on one side of said green bodies into an interior of said green bodies and sintering said green bodies to receive one or more ceramic tiles with respective cavities;
    b) arranging said one or more ceramic tiles in a cast mould, whereby the one or more ceramic tiles are used as a part of the cast mould;
    c) pouring liquid metal into said cast mould at a temperature and pressure that said cavities of said one or more ceramic tiles are filled completely or to a great extent in order to fabricate at least one intermediate metal layer to be joined with said base metal structure or component; wherein the at least one intermediate metal layer is created with mechanical interlocks between said one or more ceramic tiles and said at least one intermediate metal layer;
    d) after solidification of said poured-in metal, taking the resulting metal-ceramic structure with its mechanical interlocks between said one or more ceramic tiles and said at least one intermediate metal layer, out of said cast mould; and said one or more ceramic tiles with said at least one intermediate metal layer are then joined with said base metal structure or component.

2. The method as claimed in claim 1, wherein the metal used for said base metal structure or component, or said at least one intermediate metal layer, is a Ni-based superalloy.

3. The method as claimed in claim 1, wherein step (b) includes assembly and masking of the one or more ceramic tiles using soluble ceramics.

4. The method as claimed in claim 1, wherein said cavities in said one or more ceramic tiles are arranged in such a way that most of the ceramic at said mechanical interlocks is under compression during later use over the used temperature range.

5. The method as claimed in claim 1, wherein said base metal structure or component is a hot gas path part of a gas turbine.

6. The method according to claim 5, wherein said base metal structure or component is a stator heat shield.

7. The method according to claim 5, wherein said base metal structure or component is a combustor liner.

8. The method according to claim 5, wherein said base metal structure or component is a platform and/or airfoil of a blade and/or vane.

\* \* \* \* \*